United States Patent [19]
Strauss et al.

[11] 3,868,702
[45] Feb. 25, 1975

[54] MIRROR REFLEX CAMERA

[75] Inventors: Karl-Peter Strauss, Volkmarode; Richard Weiss, Braunschweig, both of Germany

[73] Assignee: Rollei-Werke Franke & Heidecke, Braunschweig, Germany

[22] Filed: Nov. 16, 1973

[21] Appl. No.: 416,355

[30] Foreign Application Priority Data
Nov. 24, 1972 Germany............................ 2257608

[52] U.S. Cl....................... 354/42, 354/44, 354/270
[51] Int. Cl. ............................................. G03b 9/02
[58] Field of Search ............ 354/40, 41, 42, 43, 44, 354/270

[56] References Cited
UNITED STATES PATENTS

| | | | |
|---|---|---|---|
| 1,974,433 | 9/1934 | Riszdorfer.......................... | 354/43 X |
| 3,000,281 | 9/1961 | Rentschler........................ | 354/42 X |
| 3,116,659 | 1/1964 | Waroux............................. | 354/43 X |
| 3,299,789 | 1/1967 | Chandler et al. .................... | 354/42 |

*Primary Examiner*—Joseph F. Peters, Jr.
*Attorney, Agent, or Firm*—Stonebraker & Shepard

[57] ABSTRACT

A mirror reflex camera of the type in which a diaphragm adjusting member is driven from maximum diaphragm aperture position toward minimum aperture position, and in which a photocell receiving light through the lens and the diaphragm is part of an electronic circuit which stops the closing down movement of the diaphragm aperture adjusting member when the photocell senses that the diaphragm has reached the proper aperture for the intended photographic exposure. The invention relates particularly to the brake which stops the movement of the diaphragm adjusting mechanism when the aperture is at the proper point. A rotating disk which is part of the adjusting mechanism normally has a very small air gap from the poles of an electro-magnet. When the magnet is energized, it draws the disk into actual contact with the poles of the magnet, forming an effective quick-acting brake. The electronic circuit is adjusted to energize the electro-magnet shortly before the diaphragm reaches the desired aperture, to compensate for the unavoidable time lag in operation of even a quick-acting brake of this kind, so that when the movement is stopped by the brake, the aperture will be at the desired value.

9 Claims, 4 Drawing Figures

3,868,702

MIRROR REFLEX CAMERA

CROSS REFERENCE TO RELATED APPLICATION

This application relates to an improvement on the construction disclosed in the pending application of Karl-Peter Strauss (one of the joint applicants of the present application), Ser. No. 410,251, filed Oct. 26, 1973, entitled Mirror Reflex Camera. The entire disclosure of said application is incorporated herein by reference.

BACKGROUND OF THE INVENTION

In the prior application above identified, the general arrangement is disclosed, wherein the closing down movement of the adjustable diaphragm is started either by operating the camera release to initiate the exposure cycle, or by operating a special key or switch to cause the diaphragm to close down to the indicated aperture just as it would if an exposure were taken, but not to actually take the exposure, this operation being useful for inspection so that the photographer can see what the aperture would be if he were to make an exposure at that time, and can judge whether the resulting depth of field is satisfactory. The prior application explains that when the diminishing aperture reaches the proper point as determined by the electrical circuit, the closing movement of the diaphragm can be stopped in various ways, including the operation of a brake of any suitable kind.

The present application relatess to a form of brake which is particularly suitable for this purpose. The general background of the construction will not be repeated here, it being assumed that the reader is familiar with the construction as disclosed in the prior applcation. If the present application is ready for issue before the prior application is ready for issue as a patent, the present application will be amended to include such part of the disclosure of the prior application as may be helpful for a better understanding of the present invention.

In all cases where electronic controls cause mechanical operating sequences, there is a time lag between the pilot pulse and the actual execution or mechanical operation. Thus if diaphragm adjustment is performed by an electric motor (whether of the solenoid type or of the rotary type) and it is attempted to stop the diaphragm movement at the proper point by switching off the motor, the arresting movement is delayed to a certain extent so that there is a diaphragm error. Assuming that the diaphragm closing movement is operated by a push rod (as in the prior application) the diaphragm error is slight at the beginning of the push rod movement, and then increases until an approximately constant final value is reached.

It is an object of this invention to reduce all such errors and to enable the diaphragm aperture to be set at exactly the desired value, without over-running to a smaller aperture than desired.

Another object of the invention is to make the time lag delay substantially constant over the entire setting range, so that a compensating factor can be introduced into the mechanism, which will serve to compensate for the time delay.

DESCRIPTION OF THE PREFERRED EMBODIMENTS

Figure 1:
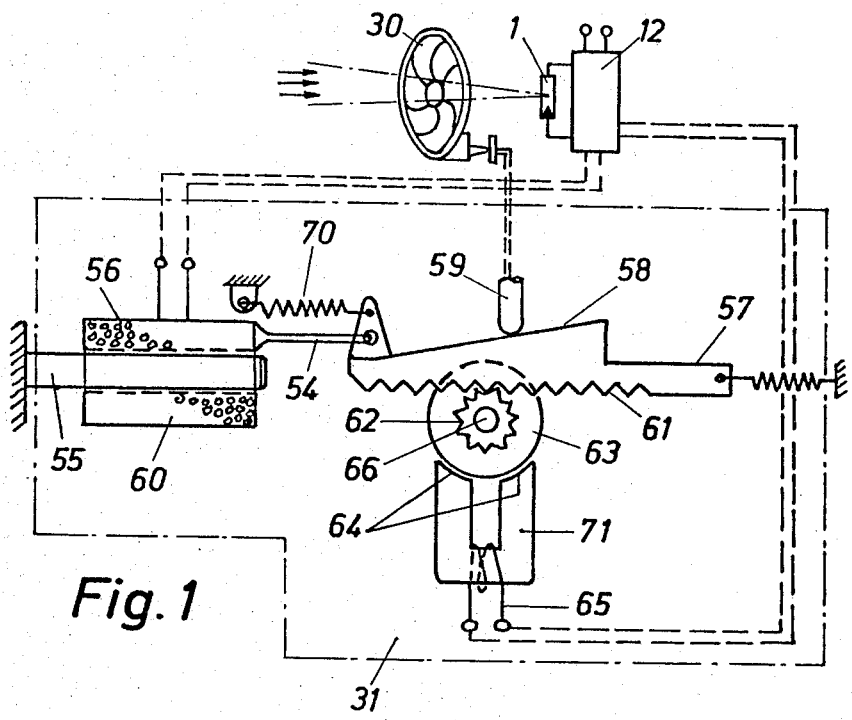
FIG. 1 is a diagramatic representation of diaphragm adjusting mechanism according to one embodiment of the present invention, with a peripherally acting brake magnet.

Referring first to the embodiment of the invention illustrated schematically in FIG. 1, the aperture of the diaphragm is set by longitudinal movement of a plunger 59 connected in any convenient manner to the diaphragm setting ring or other conventional part of the diaphragm 30. This plunger 59 corresponds to the plunger 39 in the prior application. The longitudinal movement of the plunger is accomplished by a cam 58 on the shifter rod 57 which is moved longitudinally by an electric motor such as the solenoid 60 constituting a linear motor. The similarity of this mechanism to the mechanism in the prior application will be readily apparent. The solenoid may conveniently be formed by a coil 56 slidable along the stationary core 55.

Rack teeth 61 on the rod 57 mesh with a pinion 62 fixed to a shaft 66, which shaft also carries, fixed thereto, a disk 63 of ferro magnetic material, such as soft iron. Very close to the circular peripheral edge of the disk 63, but with a very slight air gap, are the pole pieces 64 of stationary electro-magnet 71, energized by a winding 65. The winding is energized at the appropriate time by the electronic control circuit disclosed in the prior application. The winding may correspond, for example, to the part 9 in FIG. 1 or the part 19 in FIG. 2 of the drawings of the prior application. The preferred circuit is shown also in FIG. 4 of the present application, which corresponds to FIG. 1 of the prior application.

When the winding 65 is provided with current to energize the magnet 71, it pulls the periphery of the disk 63 into contact with the pole pieces of the magnet, so that the magnet acts as an effective brake to prevent further rotation of the disk 63, thereby quickly stopping movement of the shifter rod 57 and stopping the longitudinal movement of the aperture-adjusting plunger 59.

To facilitate the braking contact of the disk 63 with the magnet pole pieces 64, the disk 63 is preferably placed at the extreme end of a quite thin and therefore easily bendable or flexible portion of the shaft 66. In the normal position, there is a very slight air gap between the disk 63 and the pole pieces 64, but when the magnet is energized, it produces sufficient force to pull the disk down into contact with the magnet, flexing the shaft 66 slightly in order to do so. This produces a very rapid and efficient braking action, as above described.

Figure 2:
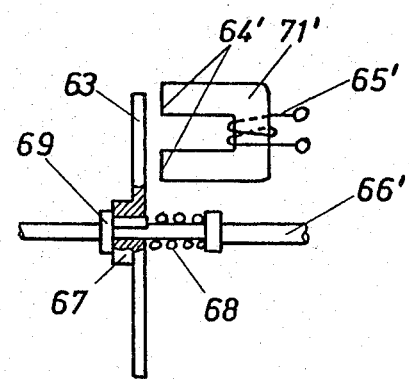
FIG. 2 is a diagramatic view similar to a fragment of FIG. 1, showing an axially acting brake magnet.

A modified construction is illustrated in FIG. 2. Here, the ferro-magnetic disk 63 is non-rotatably keyed to the shaft 66', but is able to move longitudinally on the shaft. A light spring 68 normally moves the disk 63 axially until the hub 67 of the disk engages a collar 69 fixed on the shaft 66'. In this position, there is a slight air gap between one face of the disk 63 and the pole pieces 64' of the magnet 71' arranged with its axis parallel to the shaft 66' and energized by the winding 65'.

When the electric circuit described in the prior application causes current to flow through the winding 65', the magnet 71' attracts the ferro-magnetic disk 63 and causes it to move slightly in an axial direction, against the force of the light spring 68, until the face of the disk is in contact with the pole pieces 64' of the magnet 71', and since the magnet is stationary, it acts as a brake stopping further rotation of the disk 63 and thus preventing further movement of the shifter rod 57. The disk adheres tightly to the pole pieces of the magnet, so that rotation is stopped immediately.

The drive is preferably provided with a spring 70 to produce a certain initial tension on the shifter rod 57 sufficient to keep the cam 58 tightly engaged with the end of the aperture adjusting plunger 59, but not sufficient to cause movement of the plunger 59 against the force of the conventional light springs normally tending to keep the diaphragm in its maximum aperture position. If, for example, a pulling force of 200 grams on the rod 57 is necessary to actuate the diaphragm plunger 59, the spring 70 may exert a force of 50 grams, not sufficient to cause any movement of the plunger 59, but quite sufficient to keep the cam surface 58 properly engaged with the plunger 59 so that there is no lost motion or backlash in this part of the mechanism. With such an arrangement, the mechanism may be used with different interchangeable lenses which may have different initial aperture openings.

Suitable circuits for energizing the brake magnets 71 or 71' are shown in FIGS. 1 and 2 of the prior application, in which the elements 9 and 19, respectively, represent the brake magnets of the present application. To minimize the need to refer to the prior application, the circuit of FIG. 1 of the prior application is repeated here as FIG. 4 of the present application, and the following additional explanation is given, supplementing what has been said in the prior application.

Figure 4:
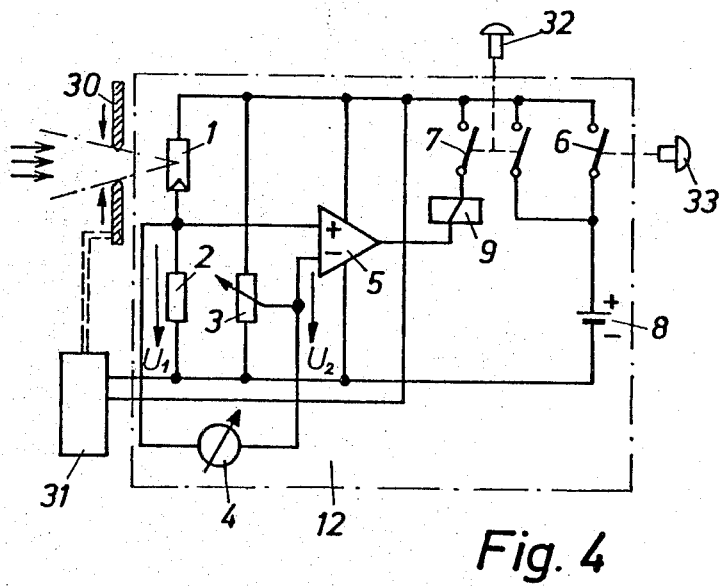
FIG. 4 is a wiring diagram of the preferred circuit.

Referring now to FIG. 4, the principal circuit parts are enclosed within the dot-dash rectangle 12, corresponding to the rectangle 12 in FIG. 1 of the present application, and the rectangle 31 in FIG. 4 represents the parts enclosed in the dot-dash enclosure 31 in FIG. 1.

The circuit 12 is one whereby, with a continuously closing diaphragm, an ever decreasing amount of light constantly measured by the photocell through the lens and diaphragm is compared with the focal aperture shown at each stopping point until the optimum working aperture is reached. At this moment the aperture operation immediately stops. In detail the circuit 12 functions as follows:

By tripping (closing) the switch 6, the circuit is connected to the battery 8. Influenced by the incident light a photoelectric current occurs in the photocell 1, which causes a voltage drop $U_1$ at the resistor 2. By adjusting the exposure time and the speed rating a voltage $U_2$ occurs at the potentiometer 3. The voltage $U_1$ corresponds to the measured actual amount of light and $U_2$ represents the desired lighting strength for the photographic exposure. The difference between the two voltages is shown by the meter instrument 4. An appropriate scale on this instrument enables the aperture value to be ascertained. Voltages $U_1$ and $U_2$ reach the inputs of the computing recording comparator (operating amplifier) 5. Under normal lighting conditions and with a corresponding adjustment of the potentiometer, the voltage $U_1$ is in the first place greater than voltage $U_2$.

As long as the voltage $U_1$ lying at the input marked with a (+) of the computing recording comparator 5 is higher than the voltage $U_2$ lying at the input marked (−), the fully battery voltage $+U_B$ occurs at its outlet. The solenoid 9 is therefore without current. This element 9 in FIG. 4 represents the winding 65 or 65' of the magnet 71 or 71' in FIGS. 1 and 2.

With the diaphragm continuously closing, the measured light amount and hence the photoelectric current and finally the voltage drop $U_1$ at resistor 2 becomes successively smaller, so that voltage $U_1$ now approaches voltage $U_2$ as set by the potentiometer 3. As soon as $U_1$ is less than $U_2$, $+U_B$ tilts over to $-U_B$ at the output of the rapidly connecting through comparator 5. The electro-magnet 9 is, therefore, lying at the full battery voltage $U_B$ and attracts. The attraction causes, as already described, the diaphragm to stop at the moment when the optimum object light amount for the photographic exposure is shown.

The comparator 5 is a standard component well known in the electronics art, so need not be described in detail.

The time lag between the time that the magnet is energized and the time that the rotation of the shaft is stopped by the braking action of the magnet, leads to a diaphragm error. At the beginning of the plunger movement this error is slight, and after a certain time it reaches a nearly constant final value, but usually not more than one stop, frequently only part of one stop. By inserting a compensation step or stage of the appropriate size (a proportional differential regulating step) into the electronic circuit 12, the circuit can be made to supply current to the winding of the magnet a little before the aperture of the diaphragm closes down to exactly the desired size, thereby compensating to a large extent for the error which would otherwise occur.

This advanced production or pre-production of the stop signal may be produced, so as to produce the signal when the diaphragm aperture, during its closing down movement, is at an aperture a little larger than the aperture appropriate for example, by adjusting the circuit as though the film speed were a little slower than the speed of the film actually used, or as though the shutter speed were a little faster (shorter exposure time) than the shutter speed actually used, which in either case would require a larger diaphragm aperture. This can be done by appropriate adjustment of the potentiometer 3, or by otherwise appropriately selecting the values of the components of the circuit.

Figure 3:
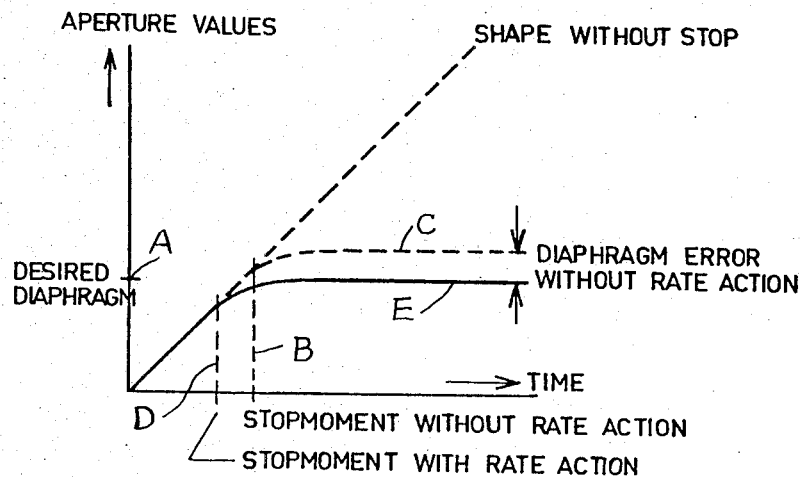
FIG. 3 is a diagram illustrating the diaphragm setting movement plotted against time, and showing how the lag error is compensated.

In FIG. 3 the time relationship is shown in the form of a diagram or graph. The vertical ordinate represents the size of the diaphragm aperture, decreasing upwardly from the bottom toward the top, while the horizontal abscissa represents time. The inclined or oblique line represents the closing movement of the diaphragm plotted against time, from the instant that the closing movement commences.

The height of the point A represents the size of the aperture to which the diaphragm should be adjusted for a given exposure. If the impulse or signal for stopping the motor and applying the brake were not given until the time B (that is, at the instant when the inclined line reached the height of the desired aperture size A) the time lag factor would cause the closing movement of the diaphragm to continue until it came to rest at a value represented by the horizontal broken line C, which would be a smaller aperture than the intended size desired for the exposure. However, according to the present invention, the electronic circuit is so designed that the impulse or signal for turning off the motor and applying the brake is given at the time D rather than at the time B, while the diaphragm is still open somewhat wider than the desired aperture appropriate for the exposure. Then, on account of the time lag, the diaphragm adjusting mechanism will come to rest when the diaphragm is at the aperture size indicated by the height of the solid horizontal line E, exactly at the right aperture size, being the same height as the previously mentioned point A. This eliminates the diaphragm error which would otherwise occur, indicated graphically by the vertical distance between the horizontal broken line C and the horizontal solid line E.

What is claimed is:

1. A mirror reflex camera of the type having a lens, a diaphragm of adjustable aperture, a photocell receiving light through said lens and diaphragm, drive means for varying the aperture of the diaphragm, and means for arresting movement of said drive means when a desired aperture size is reached during operation of said drive means, characterized by the fact that a ferro magnetic disk is coupled to said drive means to move therewith, and that an electro-magnet has a pole piece normally located close to said disk with a small clearance, and means for magnetizing said electro-magnet when said drive means is to be arrested, to cause said electro-magnet to act as a brake to stop movement of said disk and thereby to arrest movement of said drive means.

2. A device as defined in claim 1, wherein said disk is flexibly supported for movement toward said pole piece when said electro-magnet is magnetized.

3. A device as defined in claim 2, wherein said disk is mounted on a bendable shaft in such a way that the shaft bends under the influence of the magnetized electro-magnet until the disk touches said pole piece.

4. A device as defined in claim 3, wherein the periphery of the disk touches the pole piece.

5. A device as defined in claim 2, wherein said disk is axially movable on a shaft and is biased axially in a direction away from said pole piece, and said electro-magnet when magnetized draws said disk axially to bring a face thereof into contact with said pole piece.

6. A device as defined in claim 1, wherein said drive means moves said diaphragm from maximum aperture in a direction toward minimum aperture, and wherein said means for magnetizing said electro-magnet is adjusted to magnetize said electro-magnet when the closing down movement of the diaphragm reaches a slightly larger aperture than the intended aperture appropriate for a desired photographic exposure, to compensate for a time lag in bringing the closing down movement to a halt.

7. Braking mechanism for stopping adjusting movement of a diaphragm aperture adjusting drive, comprising a shaft coupled to said drive to turn while the aperture of the diaphragm is changing, a ferro-magnetic disk mounted on said shaft to turn therewith, an electro-magnet having a pole piece close to a portion of said disk with a slight air gap between the pole piece and the disk so long as the adjusting drive is intended to perform adjusting movement, and a coil for magnetizing said electro-magnet when it is desired to stop the adjusting movement of said drive, said disk and magnet being so arranged that when said electro-magnet is magnetized, it will draw said disk into contact with said pole piece to produce a braking action stopping rotation of said disk.

8. A device as defined in claim 7, wherein said shaft is transversely flexible and bends to permit the periphery of said disk to close said air gap and come into contact with said pole piece.

9. A device as defined in claim 7, wherein said disk is resiliently displaceable in an axial direction on said shaft and is axially displaced upon magnetization of said electro-magnet so that a face of said disk closes said air gap and comes into contact with said pole piece.

* * * * *